United States Patent [19]

Bakalian

[11] Patent Number: 5,201,442
[45] Date of Patent: Apr. 13, 1993

[54] REMOTE CONTROL WATER DEVICE

[76] Inventor: Aram Bakalian, 323 Homans Ave., Closter, N.J. 07624

[21] Appl. No.: 693,363

[22] Filed: Apr. 30, 1991

[51] Int. Cl.⁵ .......................... A45F 5/00; B62J 11/00; B05B 9/04
[52] U.S. Cl. ................................. 222/610; 222/608; 222/609; 222/626; 280/288.4
[58] Field of Search ..................... 222/52, 63, 608–610, 222/626, 175; 280/288.4

[56] References Cited

U.S. PATENT DOCUMENTS

| | | | |
|---|---|---|---|
| 3,612,353 | 10/1971 | Haase | 222/52 |
| 3,677,446 | 7/1972 | Guyer, Jr. et al. | 222/610 |
| 4,095,812 | 6/1978 | Rowe | 222/175 X |
| 4,150,681 | 4/1979 | Howarth, Jr. | 280/288.4 X |
| 4,274,566 | 6/1981 | Rowe | 222/610 X |
| 4,526,298 | 7/1985 | Boxer et al. | 222/175 X |
| 4,807,813 | 2/1989 | Coleman | 222/175 X |
| 4,815,635 | 3/1989 | Porter | 222/609 X |
| 4,911,339 | 3/1990 | Cushing | 222/610 |
| 5,060,833 | 10/1991 | Edison et al. | 222/175 X |
| 5,062,591 | 11/1991 | Runkel | 222/175 X |
| 5,104,016 | 4/1992 | Runkel | 222/175 X |

FOREIGN PATENT DOCUMENTS 2617472  1/1989  France .................... 222/52

*Primary Examiner*—Andres Kashnikow
*Assistant Examiner*—Lesley D. Morris

[57] ABSTRACT

A remotely actuated apparatus is provided for delivering a liquid to a desired location, particularly for use with a bicycle. The invention includes a reservoir, a pump adapted to receive liquid from the reservoir regardless of the orientation of the reservoir, a delivery tube for delivering liquid from the pump to a desired location, and a remote actuator for remotely actuating the pump. Also included in a preferred embodiment is a manifold which receives liquid from the pump. The manifold has a plurality of outlet ports to facilitate attachment of the delivery tube thereto regardless of the orientation of the apparatus. The actuator is disposed remotely from the reservoir and sends a signal which is received by a receiver means which actuates the pump to dispense refreshment liquid through the manifold to a delivery tube and then to a dispensing tube which is in close proximity to the mouth of the bicycle rider.

12 Claims, 4 Drawing Sheets

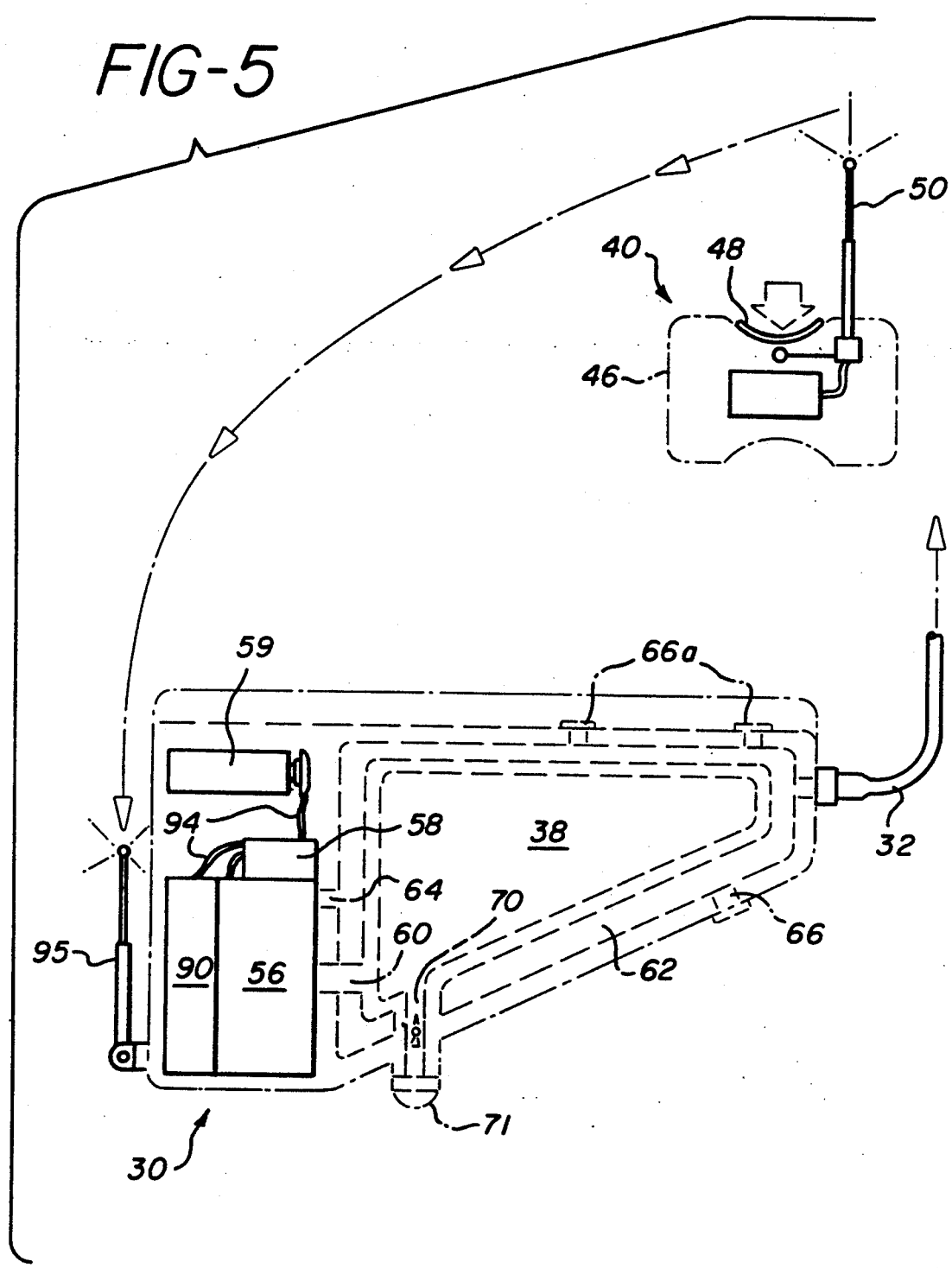

REMOTE CONTROL WATER DEVICE

FIELD OF THE INVENTION

This invention relates to a remotely actuated apparatus for delivering a liquid, particularly for delivering a potable refreshment fluid to the mouth of the user of a bicycle.

BACKGROUND OF THE INVENTION

Bicycle riding is a popular sport that often requires extended periods of activity without an opportunity for the bicycle rider to stop for necessary refreshment. Thirst is a problem which the bicycle rider often encounters.

Many efforts have been made in the past to provide a system for delivering refreshment fluid to a bicyclist, including a portable water bottle which can be accessed by the rider during riding. Such water bottle assemblies usually consist of a cage mounted to the frame of the bicycle, and a water bottle which fits within the cage. These arrangements have provided certain problems for the user. Most particularly, the cages are usually mounted on a bar extending angularly or vertically downward from the bicycle frame so that the water bottle can be held erect, therefore requiring the bicycle rider, while riding the bicycle, to remove one hand from the handle bar to reach the bottle. Further, the rider must open the bottle and tilt his or her head back in order to allow water to pour into his or her mouth. This is a dangerous procedure, as movement of the head and removal of a hand from the handle bar during riding affects the balance of the rider, and because the rider's vision is obstructed during the backward tilting of the head.

RELATED ART

This invention provides a remotely actuated apparatus for delivering a liquid. Particularly, this invention provides a refreshment fluid which can be delivered to a cyclist or other sportsman without subjecting the user to the dangers associated with removing their eyes from the area of travel ahead of them. Patents have issued for devices which provide for drinking and/or amusement, but none provide the ease and convenience of use of the present invention. Furthermore, none of these patents, taken either singly or in combination, are thought to provide the benefits of the present invention.

U.S. Pat. No. 4,815,635, to Porter, discloses a cyclist water supply apparatus, having a plurality of reservoirs to selectively supply fluid from more than one reservoir by means of a valve member, to the cyclist. Fluid is pumped by manual manipulation of a pump handle through a rotatable nozzle to the cyclist.

U.S. Pat. No. 4,911,339, to Cushinq, discloses a bicycle water pump having a hand operated valve and a nozzle mounted on the handle bars. The water pump comprises a pressurized cylindrical container which acts as a pump. Depression of the valve forces liquid out of the container, through tubing, to the nozzle and to the rider.

U.S. Pat. No. 4,274,566, to Rowe, discloses a vehicle drinking apparatus having a flexible drinking tube with a mouth piece retained in a retracting reel means, enclosed in a housing, which is mounted on a bicycle. The fixed inner end of the flexible drinking tube is connected inside the housing to a rigid or semi-rigid supply line that extends out of the housing and into a water bottle mounted on the vehicle. The device is meant to be mounted on the horizontal bar of a bicycle When the rider wants a drink, her or she pulls the mouthpiece to his or her mouth.

U.S. Pat. No. 4,807,813, to Coleman, discloses a water toy having a fluid reservoir which can be mounted on a bicycle or a rider of a bicycle. The device has a first conduit which connects the fluid reservoir to a pump for conveying fluid from the pump and through a second conduit connected to a nozzle for dispersement. The nozzle may be attached to a helmet worn by the rider.

The related art does not provide the essential elements of the present invention, nor does any disclose the efficiency of the present invention. Further, nothing in the related art teaches as safe or easy to use a system as the present invention.

SUMMARY OF THE INVENTION

The present invention sets forth a remotely actuated apparatus for delivering a liquid. In a preferred embodiment, it is adapted to be mounted on a bicycle in any of a wide number of locations on the frame of the bicycle and deliver potable refreshment fluid to the bicyclist.

The remote control water device includes a reservoir having a pump and an extended delivery tube leading from the pump to a dispensing tube which may be mounted on the handle bars of the bicycle. Preferably, the dispensing tube is positioned in close proximity to the normal position of the bicyclist's head, particularly the bicyclist's mouth. A remotely positioned actuator is also provided, preferably located on the handle of the bicycle, which actuates the pump to deliver liquid from the reservoir, through the delivery tube, to the dispensing tube near the bicyclist's mouth. The bicyclist need merely move his or her head slightly to place the tube into his or her mouth and depress the actuator to receive a quantity of refreshment fluid.

The present invention may also be utilized by wheelchair users who would be capable of obtaining a drink themselves without having to either undergo undue physical maneuvering to obtain a drink in a conventional manner or ask for help. Additionally this invention may be adapted for use by motorcyclists or for use in other activities where refreshment liquid is needed but is burdensome and/or dangerous to obtain without quitting the activity. Finally, this invention may be used simply as a device for delivering liquid without being observed, ie. a remotely actuated water gun.

Accordingly, it is an object of the present invention to provide an apparatus for storing and delivering refreshment liquid to the mouth of a bicycle rider which can be easily and conveniently mounted on a bicycle frame in a number of locations.

It is another object of this invention to provide an apparatus for storing and delivering refreshment liquid to the mouth of a bicycle rider which provides minimal interference on the frame of the bicycle.

It is also an object of the present invention to provide an apparatus for storing and delivering refreshment liquid to the mouth of a bicycle rider which allows for its mounting on the bicycle frame in numerous convenient positions out of the way of the rider.

Yet another object of this invention is to provide an apparatus for storing and delivering refreshment liquid to the mouth of a bicycle rider which enables a bicycle rider to drink fluid with a minimum of movements.

It is still another object of the invention to provide an apparatus for storing and delivering refreshment liquid to the mouth of a bicycle rider which will not upset the balance of the bicycle rider during use.

A further object of this invention is to provide an apparatus for storing and delivering refreshment liquid to the mouth of a bicycle rider which will not require the bicycle rider to reduce his or her cycling efforts during such refreshment intake.

Still another object of the invention is to provide a drinking apparatus for delivering refreshment liquid to the mouth of a bicycle rider which can be actuated by the bicycle rider without the removal of the rider's hands from the handlebars of the bicycle.

Yet another object of the invention is to provide a remotely actuated water delivering apparatus which is reliable, convenient, and relatively simple to operate.

These, as well as further objects and advantages of this invention will become apparent to those skilled in the art from a review of the accompanying detailed description of the preferred embodiment, reference being made to the accompanying drawings.

BRIEF DESCRIPTION OF THE DRAWINGS

FIG. 5 is a schematic drawing showing the interaction of the various components of the present invention.

DETAILED DESCRIPTION OF THE PREFERRED EMBODIMENT

Figure 1:
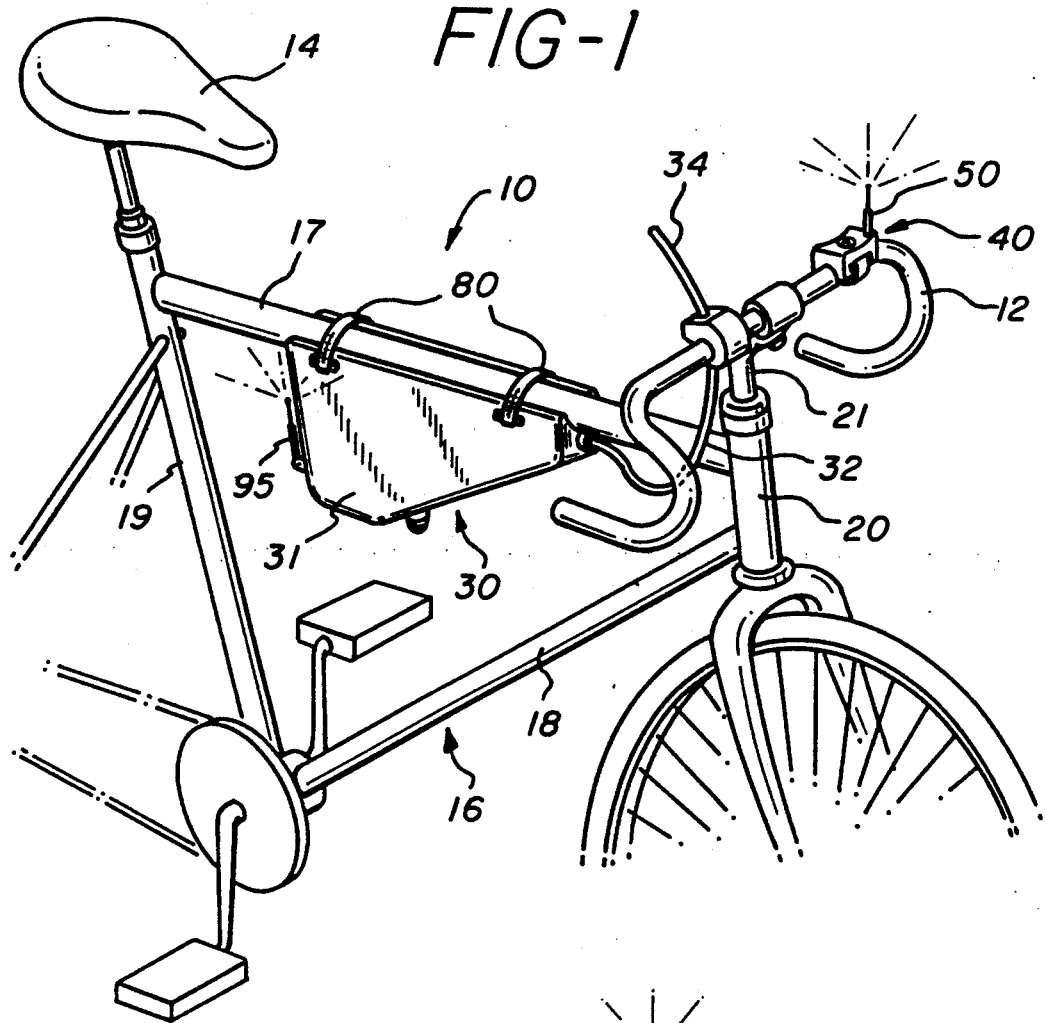
FIG. 1 is a perspective view of a bicycle showing the water dispensing apparatus incorporating the present invention mounted on the bicycle.
Figure 2:
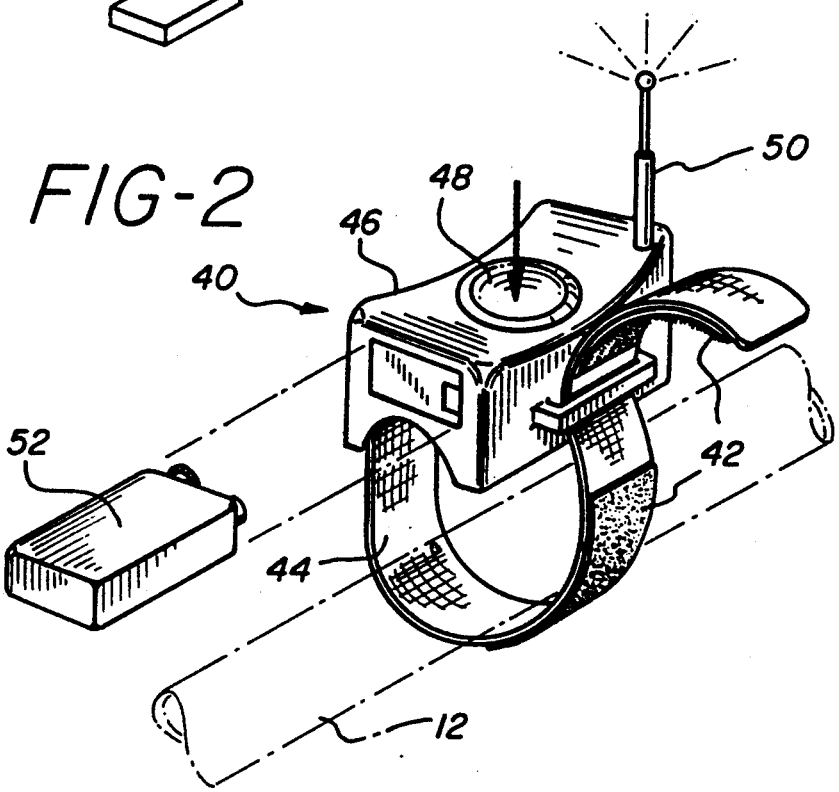
FIG. 2 is an enlarged perspective view of the remote actuator used to initiate the dispensing of water from the reservoir of the present invention.

Referring to FIGS. 1 and 2, a bicycle, generally indicated at 10 includes a seat 14, a frame 16, and handlebars 12. Bicycle frame 16 includes horizontal frame member 17, angled frame member 18, vertical frame member 19 and stem receptacle 20. Handlebars 12 include stem 21 which is received by stem receptacle 20. A liquid dispensing apparatus is generally indicated at 30 and is mounted on the horizontal frame member 17 of bicycle 10. A remote actuating means, generally indicated at 40, is mounted on the handlebar 12 of the bicycle 10.

The water dispensing apparatus 30 is typically mounted on horizontal frame member 17 and comprises a housing 31 and a delivery tube 32 which extends from housing 31 along horizontal frame member 17, up the stem 21 to the handlebars 12 where it feeds into a dispensing tube 34 extending above the handlebars 12 so as to be in close proximity to the mouth of a bicycle rider. Alternatively, the housing 31 may be mounted on vertical frame member 19 or angled frame member 18 and the delivery tube 32 may extend from the housing 31 up the vertical frame member 19 or angled frame member 18, across the horizontal frame member 17, up the stem 20 to handlebars 12 where it feeds into a dispensing tube 34 extending above the handlebars 12 so as to be in close proximity to the mouth of a bicycle rider.

FIG. 2 illustrates the remote actuating means shown generally at 40. The remote actuating means 40 is attachable to the handlebars 12 by means of a fastening strap 44 having VELCRO fasteners 42. The remote actuating means comprises actuator housing 46 having a button 48 which, when depressed, delivers an electric signal via an antenna 50 extending from the actuator housing 46. The remote actuating means 40 may be powered by any appropriate power source, typically by a battery 52 disposed within the actuator housing 46.

Figure 3:
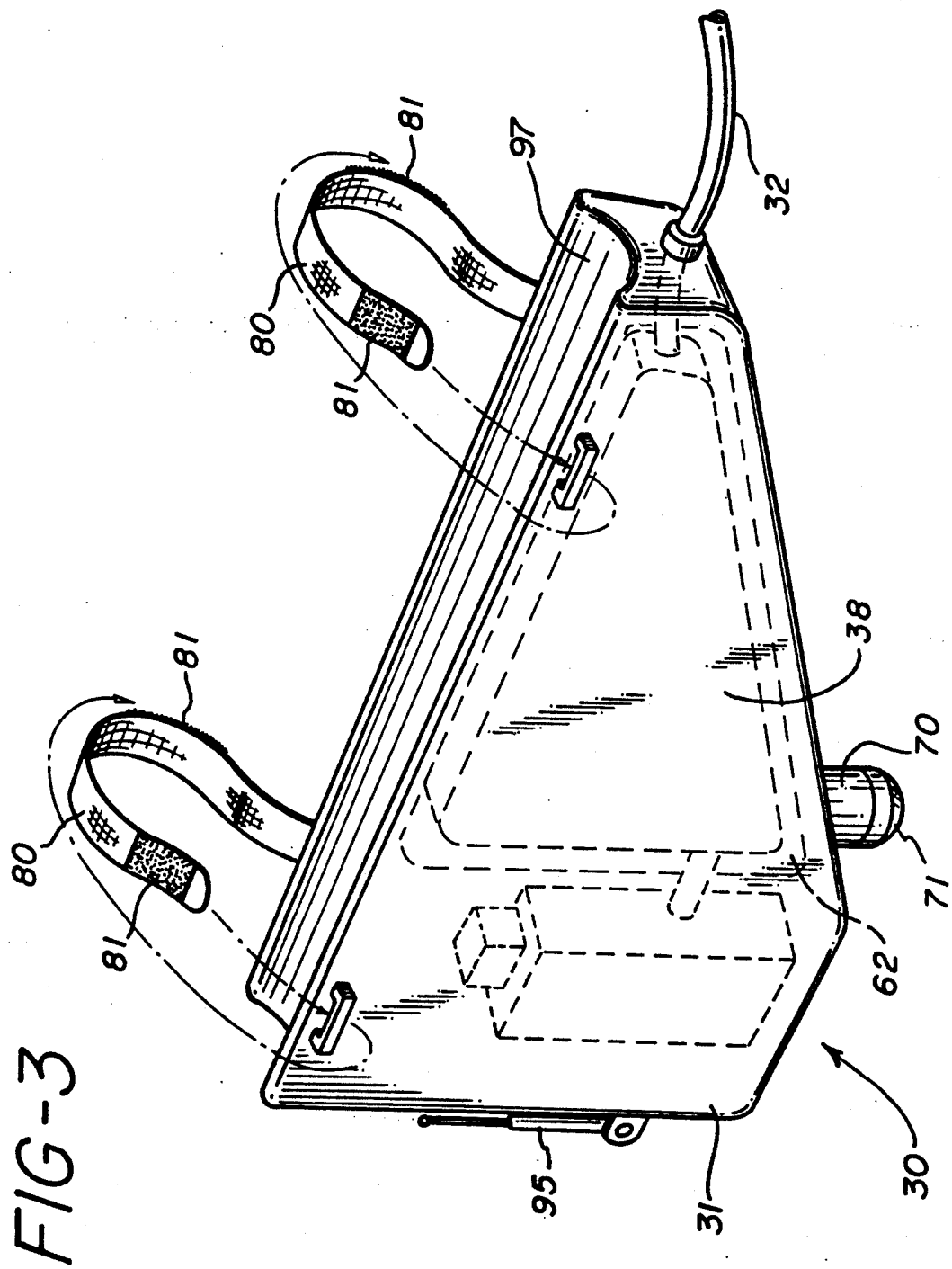
FIG. 3 is a perspective view of the housing of the water dispensing apparatus of the present invention with the major components within the housing shown in dashed lines.
Figure 4:
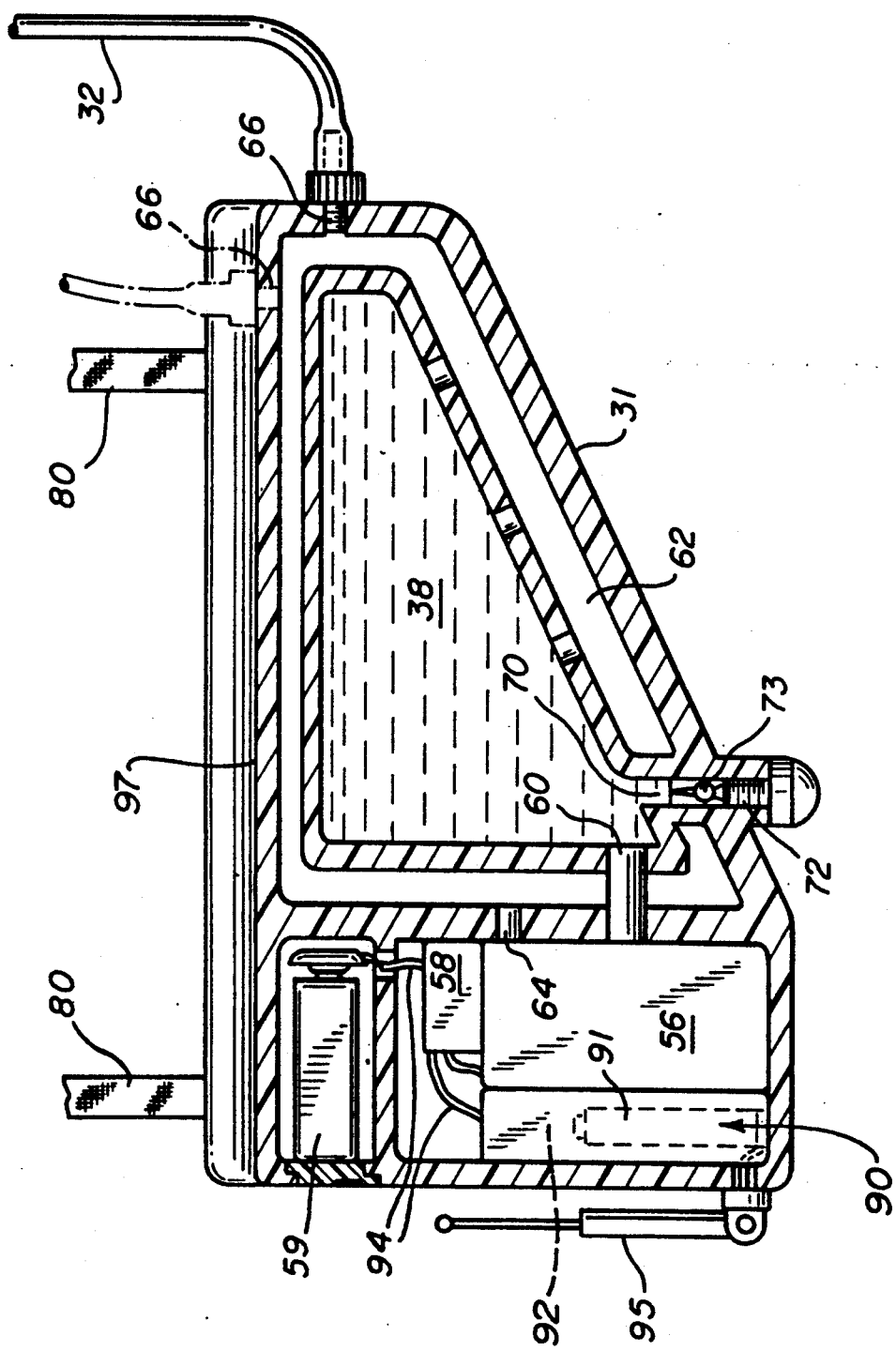
FIG. 4 is a cross-sectional view of the housing of the present invention showing the components within the housing.

As may be seen in FIGS. 3 and 4, the liquid dispensing apparatus 30 includes housing 31. Disposed within housing 31 is outer concentric manifold 62, preferably, but not necessarily enclosing therein reservoir 38, a spout 70 extends from the reservoir 38 through the outer concentric manifold 62 to the exterior of housing 31, and allows the reservoir 38 to be filled with liquid. Spout cap 71 is provided to close spout 70. A vent 72 is positioned within the spout cap 71 to enable air to enter the reservoir 38 to compensate for the removal of liquid therefrom. The vent 72, in a preferred embodiment includes a spring positioned ball 73 which sits against a valve (not shown). The liquid dispensing apparatus 30 is attachable to the frame 16 of bicycle 10, by means of fastening straps 80 having VELCRO fasteners 81. A groove 97 may be formed along the top of the housing 31 so that the housing 31 may securely and snugly attach to the frame 16.

The reservoir 38 has several outlets (only one shown at 60) connecting to a pump 56 disposed within housing 31. The outlets 60 are positioned with respect to reservoir 38 such that regardless of the position in which the housing 31 is disposed, liquid from the reservoir 38 will continue to drain into the pump 56 as the reservoir 38 is drained towards the bottom of its capacity. The pump 56 has a pump outlet 64 which leads to the outer concentric manifold 62. The manifold 62 has a number of outlet ports 66 through which the liquid may leave the housing 31 and enter the delivery tube 32. The outlet parts 66 are located in various positions along the manifold 62 to facilitate freedom to mount the liquid dispensing apparatus 30 in a wide variety of positions on the frame 16 of bicycle 10, while still providing adequate feeds for connecting the delivery tube 32 to the apparatus 30. Non-used ports 66 are stopped so that water does not flow through such ports 66 by plugs 66a. In an alternative embodiment, not shown, after passing from the reservoir 38 into pump 56, the liquid is pumped directly into the delivery tube 32.

Also disposed within the housing 31 is a pump drive means 58 for driving the pump 56. The pump drive 58 is typically powered by a battery 59. A pump drive actuating means 90 for actuating the pump drive 58 is also disposed within housing 31 and typically includes a solenoid switch 92 connected to a radio receiver 91. Also included in the actuating means, but preferably extending out of the housing 31 is antenna 95. A relay 94 is connected between the radio receiver 91 and to the battery 59, to enable a signal from the remote actuating means 40 to be received by the pump actuator antenna 95 to be relayed through the pump drive actuating means to cause the pump drive 58 to drive the pump 56 for a predetermined interval to dispense a specific quantity of liquid into the outer concentric manifold 62 and then into the delivery tube 32. The radio receiver 91 is powered by its own battery supply (not shown) positioned within the housing 31.

As shown in FIG. 5, the liquid reservoir 38 is disposed within the housing 31, and is surrounded by the outer concentric manifold 62 for purposes of compactness and for enabling appropriate orientation of the reservoir 38 with respect to the delivery tube extending from the housing 31.

In use, the delivery tube 32 extends to the handle bar 12 where it connects to a dispensing tube 34 which extends above the handlebar 12 to a position near the mouth of a rider of a bicycle. The rider can move his or her head slightly and place the dispensing tube 34 in his or her mouth. The rider then actuates the actuating means 40 by depressing button 48 to send a signal which is received by the pump actuator antenna 95, and which passes to the pump drive actuating means to actuate the pump drive 58 to drive the pump 56 to deliver liquid to the manifold 62 and then to the delivery tube 32 and finally to the dispensing tube 34, to deliver the liquid to the mouth of the rider.

It should now be apparent that the apparatus described has several advantages. First, it can be mounted in a wide variety of locations on a bicycle including the vertical frame member 19, the horizontal frame member 17, or the angled frame member 18. Further, the numerous outlet ports 66 extending from the manifold 62 out of the housing 31 allow great flexibility with respect to the position in which the apparatus 30 is mounted.

The operation of the device 30 is relatively simple and few adjustments are necessary because the dispensing tube 34 is relatively flexible and can be deformed or bent to the desired position. The refreshment liquid is delivered quickly and easily with no danger of spillage or loss, nor must the rider, in taking a drink, move his or her head or take his or her eyes off the road or reduce the effort he or she is expending to any substantial degree.

In another embodiment of this invention, not shown, the actuating means is connected to the pump drive means directly via wires.

Also within the scope of this invention are various modifications to allow the invention to be adapted for use in connection with a wheelchair by a person in a wheelchair, use in connection with a motorcycle by a motorcycle rider, and use as a remote controlled water gun. Having thus described my invention in detail, it is to be understood that the foregoing description is not intended to limit the spirit and scope thereof. What is desired to be protected by Letters Patent is set forth in the appended claims.

What is claimed is:

1. An apparatus for dispensing liquid by remote actuation comprising:
   a housing;
   a reservoir, having an inlet and an outlet disposed in said housing;
   a manifold, having a inlet and a plurality of outlets, disposed in said housing;
   pumping means disposed in said housing having an inlet and an outlet, the outlet of said reservoir connected to the inlet of said pumping means, the outlet of said reservoir disposed in the housing such that regardless of the position in which the housing is disposed, liquid may flow from said reservoir to said inlet of said pump, the outlet of said pumping means connected to the inlet of said manifold;
   pump drive means in said housing connected to said pump to drive said pump;
   a delivery tube extending from one of said outlets of said manifold;
   a dispensing tube connected to the other end of said delivery tube;
   remote actuating means remotely disposed from said pump drive means for actuating said pump drive means;
   receiver means for receiving and communicating said remote actuating means to said pump drive means to drive said pumping means to deliver liquid from said reservoir to said manifold, then to said delivery tube and then to said dispensing tube;
   the receiver means comprising:
   an electrical actuating means;
   a radio receiver within said housing connected to said electrical actuating means;
   said radio receiver having an antennae extending out of said housing for receiver radio signals from said remote actuating means; and
   a relay connecting said electrical actuating means to said pump drive means to actuate said pump upon receipt of a signal by said receiver means.

2. The apparatus of claim 1 wherein the housing is triangular in shape and adapted to conform to the frame of a bicycle.

3. The apparatus of claim 2 further comprising mounting means on said housing for mounting said housing to a frame member of a bicycle.

4. The apparatus of claim 3 further comprising mounting means on said remote actuating means adapted to mount said remote actuating means on the handle bars of a bicycle.

5. The apparatus of claim 4 wherein the dispensing tube is relatively flexible and can be bent to variety of positions for dispensing liquid.

6. The apparatus of claim 5 further including a recessed area along one side of the housing to allow a snug fit with a frame member of a bicycle.

7. An apparatus for dispensing liquid by remote actuation comprising:
   a housing;
   a reservoir, having an inlet and an outlet, disposed in said housing;
   a manifold, having a inlet and a plurality of outlets, disposed in said housing;
   pumping means disposed in said housing having an inlet and an outlet, the outlet of said reservoir connected to the inlet of said pumping means, the outlet of said reservoir disposed in the housing such that regardless of the position in which the housing is disposed, liquid may flow from said reservoir to said inlet of said pump, the outlet of said pump means connected to the inlet of said manifold;
   pump drive means in said housing connected to said pump to drive said pump;
   a delivery tube extending from one of said outlets of said manifold;
   a dispensing tube connected to the other end of said delivery tube;
   remote actuating means remotely disposed from said pump drive means for actuating said pump drive means;
   radio transmission means associated with said remote actuating means;
   receiver means comprising radio receiving means connected to said pump drive means, said radio receiving means adapted to actuate said drive mechanism upon receiving a signal from said radio transmission means to drive said pumping means to deliver liquid from said reservoir to said manifold, then to said delivery tube and then to said dispensing tube.

8. The apparatus of claim 7 wherein the housing is triangular in shape and adapted to conform to the frame of a bicycle.

9. The apparatus of claim 8 further comprising mounting means on said housing for mounting said housing to a frame member of a bicycle.

10. The apparatus of claim 9 further comprising mounting means on said remote actuating means adapted to mount said remote actuating means on the handle bars of a bicycle.

11. The apparatus of claim 10 wherein the dispensing tube is relatively flexible and can be bent to a variety of positions for dispensing liquid.

12. The apparatus of claim 11 further including a recessed area along one side of the housing to allow a snug fit with a frame member of a bicycle.

* * * * *